United States Patent [19]

Hosaka et al.

[11] Patent Number: 4,640,250

[45] Date of Patent: Feb. 3, 1987

[54] METHOD AND APPARATUS FOR ENGINE KNOCK LEVEL CONTROL

[75] Inventors: Akio Hosaka; Akito Yamamoto, both of Yokohama, Japan

[73] Assignee: Nissan Motor Company, Limited, Yokohama, Japan

[21] Appl. No.: 698,916

[22] Filed: Feb. 6, 1985

[30] Foreign Application Priority Data

Feb. 7, 1984 [JP] Japan .................................. 59-19362

[51] Int. Cl.⁴ .............................................. F02P 5/15
[52] U.S. Cl. ........................................ 123/425; 73/35
[58] Field of Search .................... 123/425, 435; 73/35

[56] References Cited

U.S. PATENT DOCUMENTS

| 4,002,155 | 1/1977 | Harned et al. | |
|---|---|---|---|
| 4,153,020 | 5/1979 | King et al. | |
| 4,236,491 | 12/1980 | Hattori et al. | 123/425 |
| 4,268,910 | 5/1981 | Omori et al. | 123/425 X |
| 4,319,480 | 3/1982 | Yamaguchi et al. | 73/35 |
| 4,455,862 | 6/1984 | Takeuchi | 73/35 |
| 4,467,634 | 8/1984 | Rohde et al. | 73/35 |

FOREIGN PATENT DOCUMENTS

| 191459 | 11/1982 | Japan | 123/425 |
|---|---|---|---|
| 162768 | 9/1983 | Japan | 123/425 |

Primary Examiner—Tony M. Argenbright
Attorney, Agent, or Firm—Schwartz, Jeffery, Schwaab, Mack, Blumenthal & Evans

[57] ABSTRACT

A method and apparatus for controlling knock level in an internal combustion engine having knock induced vibrations and valve noises. Engine knock is decided when the knock induced vibration level exceeds at least one of the valve noise level and a limiting level. A basic value for the timing of ignition of the engine is calculated based upon engine operating parameters. The basic value is modified according to the result of the engine knock decision in a manner to operate the engine close to its knock level.

21 Claims, 8 Drawing Figures

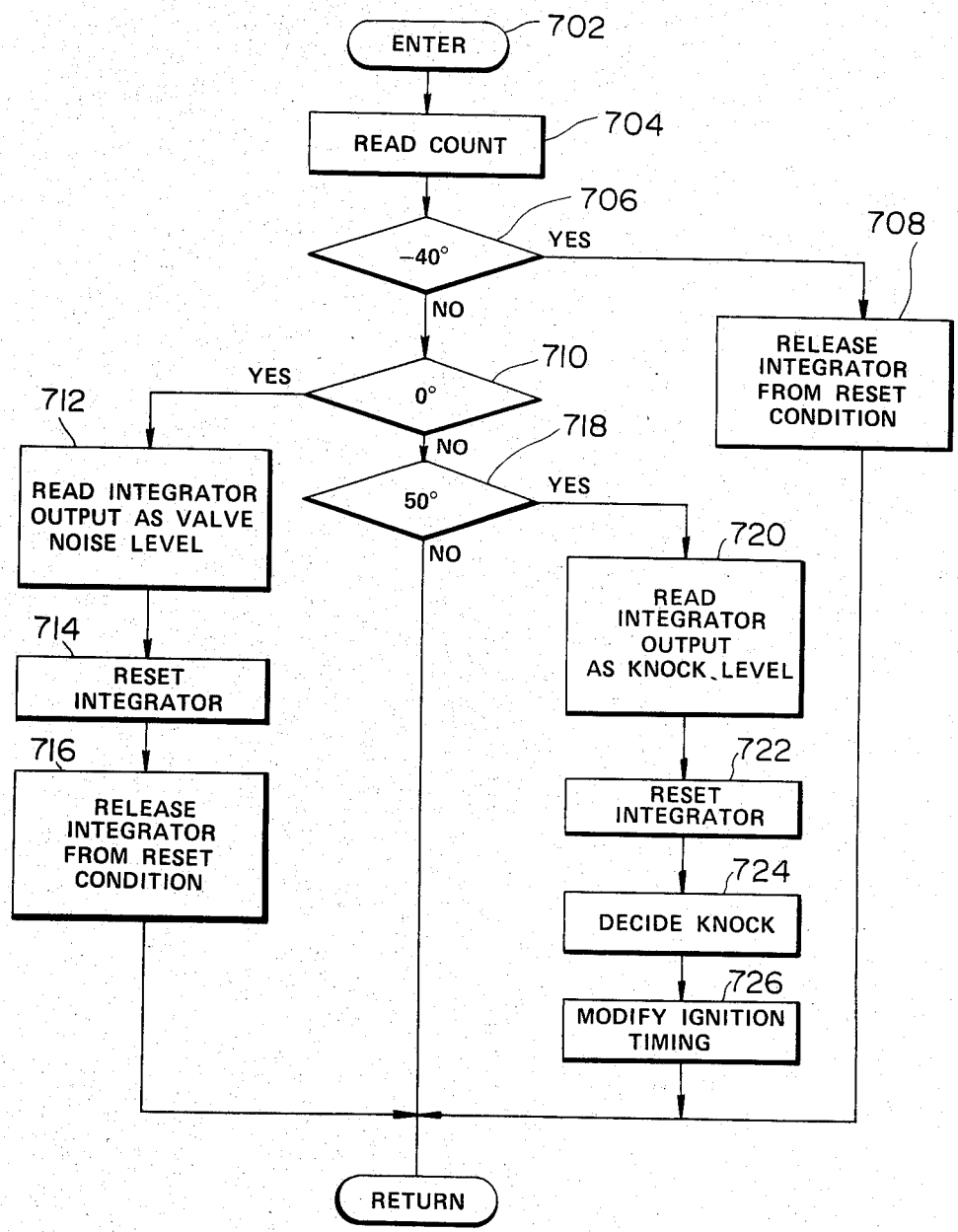

ated Aug. 10, 1982, and is
METHOD AND APPARATUS FOR ENGINE KNOCK LEVEL CONTROL

BACKGROUND OF THE INVENTION

This invention relates to the control of the level of knock or detonation produced in an internal combustion engine.

To obtain the maximum fuel economy and maximum peformance from the engine, it is necessary to run the engine quite close to its knock level. There have been developed engine knock level control apparatus for use in operatiang an internal combustion engine under a light knock condition. One example of conventional apparatus is disclosed and described in U.S. Pat. No. 4,343,278, to Asano, which issued Aug. 10, 1982, and is assigned to the same assignee as is this invention.

Such a conventional engine knock level control apparatus employs a vibration sensor secured to the engine cylinder block to generate a vibration signal corresponding to knock induced vibrations at a characteristic frequency. The vibration signal is applied to a bandpass filter which filters out signal components at frequencies other than the characteristic frequency. The filtered vibration signal is rectified and then averaged in providing a knock limiting level, as indicated by dotted curve C of FIG. 1 which is a graph of engine speed versus vibration level. The apparatus also includes a first comparator which compares the filtered vibration signal with the knock limiting level and generates a knock decision signal when the former exceeds the latter. The knock decision signal is integrated from the time at which an ignition spark event occurs. A second comparator compares the result of integration of the knock decision signal with a reference value which is a variable value depending on the knock limiting level, and generates a timing adjustment signal, thereby retarding the timing of ignition spark events of the engine so as to reduce the engine knock level.

Although apparatus of this kind have many advantages, one difficulty arises in that the engine cannot run sufficiently close to its knock level over the entire range of engine speed, since the knock limiting level C, which increases with increase in engine speed as shown in FIG. 1, should be restricted below another vibration limiting level, indicated by dotted line A, which indicates the vibration level above which heavy vibrations occur to produce the possibility of failure of engine parts such as piston and piston ring.

Furthermore, it is necessary to restrict the level of knock induced vibrations below the level of engine sounds resulting from engine vibrations in order to keep passenger's nerves from being annoyed by knock induced sounds. The engine vibrations which cause engine sounds, are produced mainly when the intake and exhaust valves seat or lift off the associated valve seats. This level of the engine vibrations increases with increase in engine speed, as indicated by curve B of FIG. 1.

Therefore, the present invention provides an improved engine knock level control method and apparatus which can operate an internal combustion engine quite close to its knock level substantially over the entire range of engine operating conditions, thereby maximizing engine peformance and fuel economy.

SUMMARY OF THE INVENTION

There is provided, in accordance with the present invention, a method of controlling the level of knock in an internal combustion engine having knock induced vibrations and valve noises. A basic value for the timing of ignition of the engine is calculated based upon engine operating parameters such for example as engine load, engine speed and engine temperature. A vibration indicative signal is generated in response to knock induced vibrations and valve noises. In resonse to the vibration indicative signal, first and second signals are generated, the first signal corresponding to the level of the knock induced vibrations, the second signal corresponding to the level of valve noises. Engine knock is decided when the first signal exceeds at least one of the second signal and a third signal corresponding to a limiting level. The basic value for the timing of ignition of the engine is modified by the result of decision of the engine knock.

In another aspect, the present invention provides a knock level control apparatus for controlling the level of knock in an internal combustion engine having knock induced vibrations and valve noises. The apparatus comprises means for generating first, second and third signals, the first signal corresponding to the level of the knock induced vibrations, the second signal corresponding to the level of the valve noises, the third signal corresponding to a limiting level. A control circuit decides the occurrence of engine knock when the first signal exceeds at least one of the second and third signals. The control circuit includes means for calculating a basic value for the timing of ignition of the engine based upon engine operating parameters. The control circuit also includes means for modifying the basic value based upon the result of decision of engine knock and generating a timing adjustment signal corresponding to the modified basic value. The timing adjustment signal is applied to a device which thereby timing the ignition of the engine.

BRIEF DESCRIPTION OF THE DRAWINGS

The present invention will be described in greater detail by reference to the following description taken in connection with the accompanying drawings, in which:

FIG. 7 is a flow diagram illustrative of the operation of the digital computer used in the control apparatus of FIG. 6 to modify a basic value for the timing of ignition spark events of the engine.

DETAILED DESCRIPTION OF THE PREFERRED EMBODIMENTS

Figure 2:
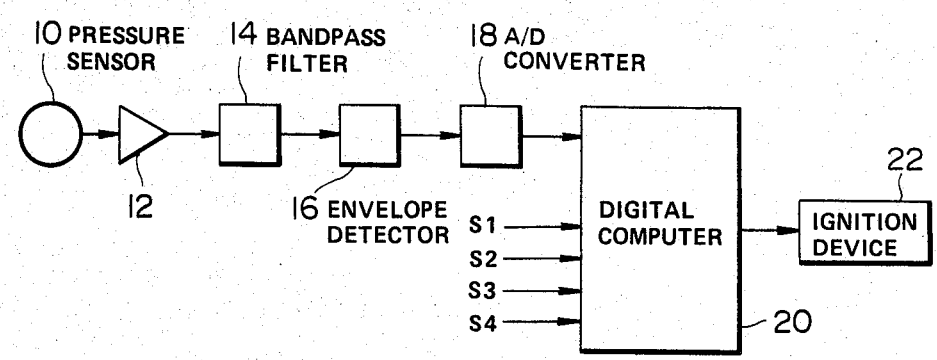
FIG. 2 is a block diagram showing one embodiment of a knock level control apparatus made in accordance with the present invention.

One embodiment of the knock level control system of this invention is set forth in block form in FIG. 2 of the drawing. The knock level control system of this invention may be used in combination with a spark ignited internal combustion engine. In the interest of reducing drawing complexity, and since internal combustion engines are old and well-known in the art and, per se, form no part of this invention, the engine has not been shown in the drawing.

To produce an input signal coincident with the cylinder pressure of a selected monitored engine cylinder, a force ring 10 of the piezoelectric type and a charge amplifier circuit 12 are employed. The force ring 10, which may be firmly securred to the engine by a spark plug or a cylinder head bolt tightened to rated torque, serves as a cylinder pressure signal source. The force ring 10 generates a charge signal to the charge amplifier circuit 12 which converts it into a voltage signal corresponding to the pressure exerted on the force ring 10. One example of a cylinder prssure signal source suitable for use with the knock level control system of this invention is set forth in schematic form in FIG. 3.

Figure 3:
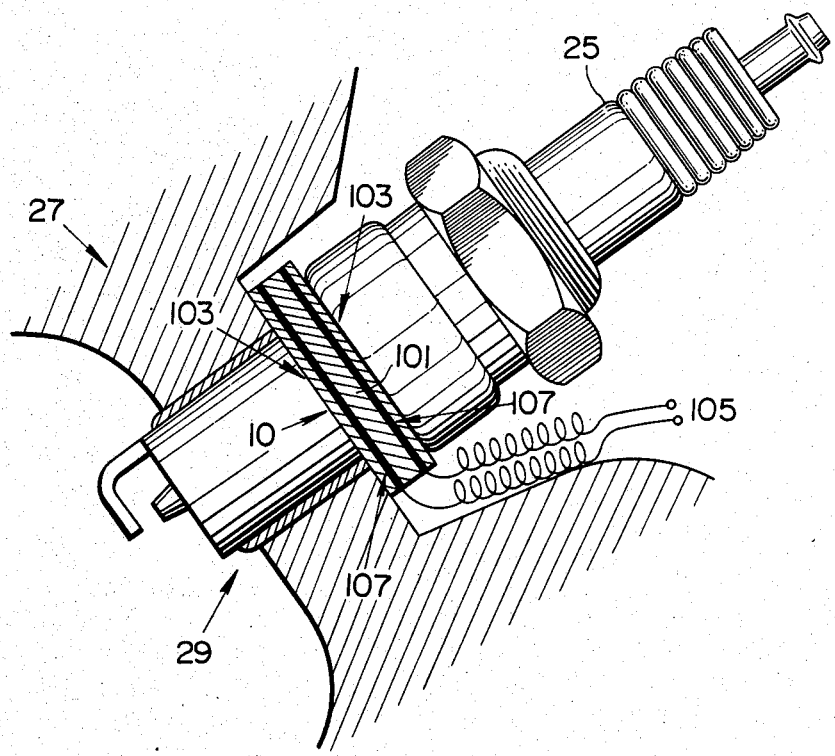
FIG. 3 is a schematic sectioal view showing a cylinder pressure sensor used in the apparatus of FIG. 2.

Referring to FIG. 3, the force ring 10 circumscribes a spark plug 25 which is secured in the cylinder head 27 of the monitored enginecylinder 29 in a manner to tighten the force ring 10 against the cylinder head 27. During engine operation, the spark plug 25 moves and vibrates due to cylinder pressure variations and engine vibrations transmitted thereto, varying the pressure exerted on the force ring 10. The force ring 10 includes a piezoelectric element 101 sandwiched between a pair of ring electrodes 103 from which lead wires 105 extends. An insulating member 107 is provided to insulate the force ring 10 from the spark plug 25 and the cylinder head 27. The force ring 10 generates a charge signal through the lead wires 105, the charge signal varying with variations in the pressure exerted on the piezoelectric element 101. The pressure exerted on the piezoelectric element 101 varies, depending upon the cylinder combustion prssure, knock-induced cylinder pressure vibrations, and engine vibrations transmitted to the spark plug 25. The engine vibrations include valve noises, that is, vibrations induced when the intake valve seats on the associated valve seat and vibrations induced when the exhaust valve lefts off the associated valve seat.

Referring back to FIG. 2, the force ring-charge amplifier circuit combination produces an output signal of a potential magnitude proportional to a change of the pressure exerted on the force ring 10. The output signal of the charge amplifier circuit 12 is applied to a conventional bandpass filter circuit 14 which filters out unnecessary components of the input signal. The bandpass filter circuit 14 may be a high pass filter circuit which filters out the low frequency signal component and passes the high frequency signal component. The resulting output signal on the output terminal of the bandpass filter circuit 14 is set forth in FIG. 4.

Figure 4:
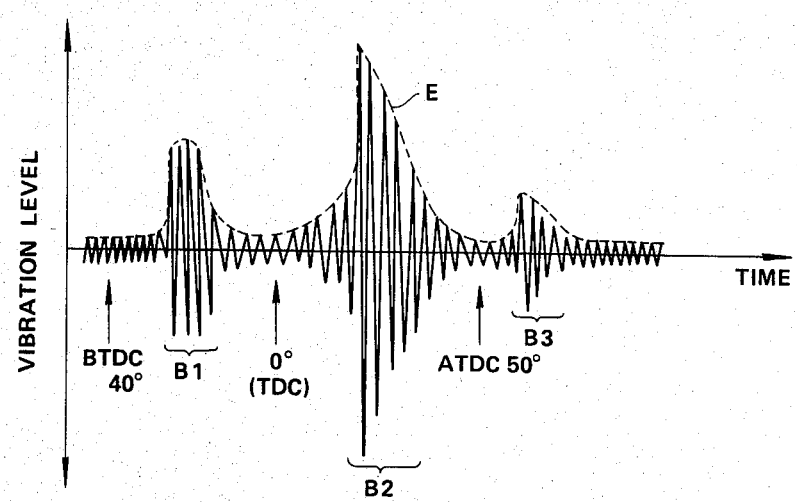
FIG. 4 contains waveforms obtained at points in the block diagram of FIG. 2.

As can be seen from FIG. 4, the output signal has peaks B1 in the engine crankshaft angle range from 40 engine crankshaft degrees before piston top dead center to 0 engine crankshaft degrees relative to piston top dead center. The peaks B1 indicates valve noises, that is, vibrations induced when the intake valve seats on the corresponding valve seat. The output signal has peaks B2 in the engine crankshaft angle range from 0 engine crankshaft degrees relative to top dead center to 50 engine crankshaft degrees after top dead center, the peaks B2 indicating knock induced vibrations. The output signal also has peaks B3 in the engine crankshaft angle range of 50 engine crankshaft degrees or more after top dead center. The peaks B3 indicates valve noises, that is, vibrations induced when the exhaust valve lifts off the associated valve seat. That is, the output signal from the bandpass filter circuit 14 includes peaks B2 indicating vibrations correlative to engine knock and peaks B1 and B3 indicating vibrations correlative to sounds produced from the engine.

In FIG. 2, the output signal of the bandpass filter circuit 14 is applied to an envelop detector circuit 16 which is comprised of a so-called peak follower circuit which generates an envelop signal indicated by the envelop E of the signal of FIG. 4. The envelop signal is applied to an analog-to-digital converter 18 which converts it into a corresponding digital signal for application to a digital computer 20.

The digital computer 20, which shall be regard as including an analog multiplexer, an analog-to-digital converter, a central processing unit, a memory, an interrupt circuit, and a clock oscillator, operates under a program control sequence in response to sensed engine operating conditions for controlling various engine operating parameters. The digital computer is responsive to an interrupt signal to temporarily stop execution of the program control sequence to start executing an interrupt routine for controlling the parameters during a specified operating condition.

The digital computer 20 has additional inputs from various sensors. Input signals to the digital computer include but are not necessarily limited to a reference position signal S1 coincident with a predetermined engine crankshaft angle, a crankshaft position signal S2 coincident with a predetermined number of degrees of rotation of the engine crankshaft, a signal S3 indicative of the sensed air flow rate Q to the engine, a signal S4 indicative of the sensed engine coolant temperature Tw. For example, the reference position signal S1 includes a series of reference pulses each corresponding to 720 engine crankshaft degrees and the crankshaft position signal S2 includes a series of pulses each corresponding to one degree of rotation of the engine crankshaft. Each of the signals S1 and S2 is used in generating an interrupt signal to temporarily stop execution of the program control sequence and to start executing an interrupt routine. The signals S1 and S2 are also applied to a frequency counter which generates a signal indicative of engine speed N. The analog signals S3 and S4 are applied to the analog-to-digital converter which converts them into corresponding digital signals indicative of the sensed air flow rate Q and the sensed engine coolant temperature Tw, respectively.

The digital computer 20 calculates a basic value for the timing of ignition spark events of the engine based upon engine operating parameters including engine load, engine speed, and engine temperature. The digital computer generates first, second and third signals, the first signal corresponding to the level of the knock induced vibrations, the second signal corresponding to the level of the valve noises, the third signal corresponding to a limiting level. The digital computer decides the occurrence of engine knock when the first signal exceeds at least one of the second and third signals. The digital computer modifies the basic value based upon the result of the engine knock decision and generates a timing adjustment signal corresponding to the modified basic value to an ignition device 22 which thereby times the ignition spark events of the engine.

The ignition device 22 may be of the conventional type which includes a switching transistor connected with the primary winding of an ignition coil. The transistor is switched on and off to cause spark firing energy to be developed to fire the spark plugs of the engine in response to the timing adjustment signal.

Figure 5:
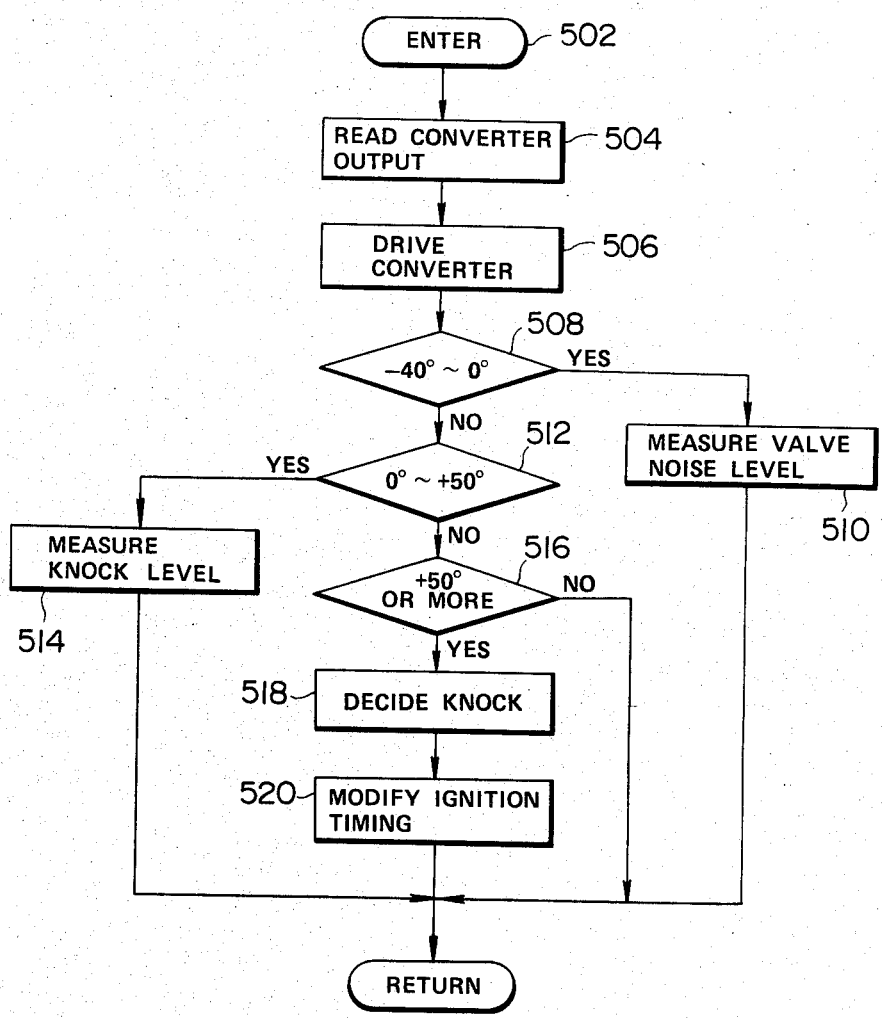
FIG. 5 is a flow diagram illustrative of the operation of the digital computer used in the control apparatus of FIG. 2 to modify a basic value for the timing of ignition spark events of the engine.

FIG. 5 is a flow diagram illustrating the programming of the digital computer 20 as it is used to control the engine knock level by modifying the basic value for ignition spark events of the engine, the basic value having been calculated in a well-known manner based upon engine operating parameters including the sensed engine speed N. intake air flow rate Q, and engine coolant temperature Tw.

The computer program is entered at the point 502 at constant time intervals, for example, of 100 microseconds. At the point 504 in the program, the digital computer central processing unit reads the output of the analog-to-digital converter 18 which has been driven to convert the envelop signal into digital form during the previous cycle of execution of this program. At the point 506, the analog-to-digital converter 18 is driven to convert the next update envelop signal value into digital form. At the point 508 in the program, a determination is made as to whether or not the engine crankshaft position is in the range between −40° and 0° relative to the piston top dead center position. For this purpose, the digital computer central processing unit reads the count of the counter which counts crankshaft position pulses S2 and clears the count upon the occurrence of a reference position pulse S1, and compares the count with a reference value corresponding to 40 engine crankshaft degrees before top dead center an another reference value corresponding to the piston top dead center position.

If the result of step 508 is "yes", then the program proceeds to the point 510 where the digital computer measures the level of vibrations induced when the intake valve seats on the associated valve seat. For this purpose, the digital computer measures the level of the vibration indicative signal (envelop signal) in the engine crankshaft angle range between −40° and 0° relative to the piston top dead center position and reads the measured value as the valve noise level. For example, the vibration level may be measured in a manner to calculate the maximum value, the integrated value, or the continuation time period. The maximum value can be calculated by maintaining, in the digital memory, a greater one of the values which have been read at the point 504 in sequence during the engine crankshaft position being in the range from −40° to 0° relative to the piston dead center position. The integrated value can be calculated merely by adding the read values since the program is entered at constant time intervals. The continuation time peiod can be calculated by counting the number of the read values greater than a reference value. Alternatively, the vibration level may be measured by calculating the product of the maximum value and the continuation time peiod.

If the answer in step 508 is "no", then the engine crankshaft position is out of the range between −40° and 0° relative to the piston to dead center position and anotaher determination is made at the point 512. This determination is as to whether or not the engine crankshaft position is in the range between 0° and +50° relative to the piston top dead center position. The determination is made by comparing the count of the counter with a reference value corresponding to the piston top dead center position and another reference value corresponding to 50 engine crankshaft degrees after top dead center. As desribed above, the counter counts crankshaft position pulses S2 and clears the count upon the occurrence of a reference position pulse S1.

If the answer to this question of step 512 is "yes", then the program proceeds to the point 514 where the digital computer measures the level of vibrations induced by engine knock. For this purpose, the digital computer measures the level of the vibration indicative signal (envelop signal) in the engine crankshaft angle range between 0° and +50° relative to the piston top dead center position and reads the measured value as the knock induced vibration level. For example, the knock induced vibration level may be measured in a manner to calculate the maximum value, the integrated value, or the continuation time period. The maximum value can be calculated by maintaining, in the digital memory, a greater one of the values which have been read at the point 504 in sequence during the engine crankshaft position being in the range from 0° to +50° relative to the piston top dead center position. The integrated value can be calculated merely by adding the read values since the program is entered at constant time intervals. The continuation time period can abe calculated by counting the number of the read values greater than a reference value. Alternatively, the knock induced vibration level may be measured by calculating the product of the maximum value and the continuation time period.

If the answer to the question in step 512 is "no", then it means that the engine crankshaft position is out of the range between 0° and +50° relative to the piston top dead center position and another determination is amde at the point 516. This determination is as to whether or not the engine crankshaft position is greater than +50° relative to the piston top dead center position. The determination is made by comparing the count of the counter with a reference value corresponding to 50 engine crankshaft degrees after top dead center. As described above, the counter counts crankshaft position pulses S2 and clears the count upon the occurrence of a reference position pulse S1.

If the answer to this question in step 516 is "yes", then the program proceeds to the point 518 where the digital computer center processing unit decides the occurrence of engine knock. This decision is made when the vibration level, which is correlative to engine knock, measured at the point 514 is greater than at least one of the vibration level, which is correlative to engine sound, measured at the point 510 and an upper limit (line A of FIG. 1) required for engine protection. For this purpose, the digital computer compares the knock induced vibration level measured at the point 514 with the vibration level measured at the point 510 and also the the upper limit level. It is therefore understood that the arrangement of this embodiment sets a limiting level for knock induced vibrations as indicated by solid lines D of FIG. 1.

Figure 1:
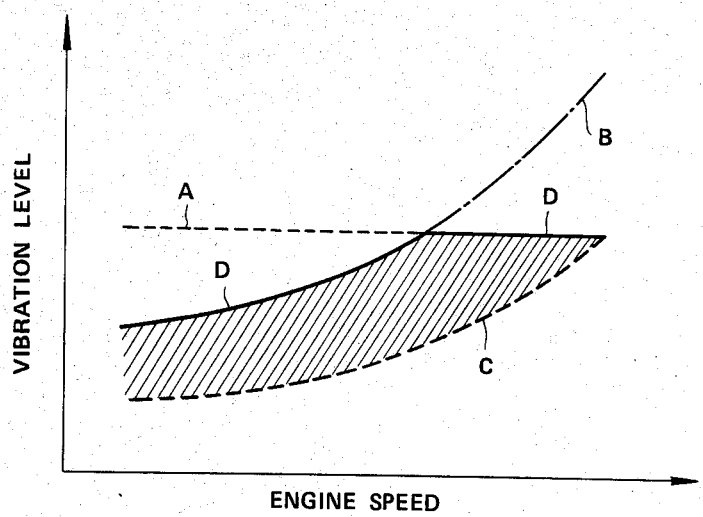
FIG. 1 is a graph of engine speed versus engine vibration level.

Although the upper limit required for engine protection is shown as a constant value in FIG. 1, it is to be noted that it may be a variable value which depends on one or more engine operating conditions. For example, considering piston temperature rise caused by engine knock, the temperature is in direct proportion to the energy of pressure fluctuations caused by engine knock. The energy is in direct proportion to the product of the magnitude of the knock induced vibration and the knock occurrence frequency, that is, the engine speed. Consequently, the vibration limiting level is in inverse proportion to the engine speed, assuming that the limiting level for the temperature is constant. In order to provide greater control accuracy, it is preferable to determine the upper limit by looking at a function table which stores signals indicative of upper limit as a function of engine speed of engine speed and intake air flow rate.

In this embodiment, only the level of vibrations B1 induced when the intake valve seats on the associated valve seat is measured as the level of vibrations correlative to engine sound since it is normally greater than the level of vibrations B3 induced when the exhaust valve lifts off the associated valve seat, as shown in FIG. 4. It is to be noted, of course, that the level of vibrations B3 induced when the exhaust valve lifts off the associated valve seat may be measured as well as the level of vibrations B1 induced when the intake valve seats on the associated valve seat in determining the level of vibrations correlative to engine sound.

Following the knock decision at the point 518, the program proceeds to the point 520 where the digital computer central processing unit modifies the basic value for the timing of the ignition spark events of the engine, the basic value having been calculated based upon data including the sensed engine speed, intake air flow rate and engine coolant temperature. If engine knock is decided at the point 518, then this modification is made by adding a correction factor to the calculated basic value so as to retard the ignition timing, reducing engine knock. If the sensed condition is not decided as engine knock at the point 518, then the digital computer central processing unit maintains the calculated basic ignition timing value or subtracting the correction factor from the calculated basic value so as to advance the ignition timing. In order to optimize the operation stability and the time response of the knock level control system to engine knock, the correction factor may be a variable value which depends on the ratio of the vibrations B2 correlative to engine knock to the vibrations B1 correlative to engine sound.

Although this embodiment permits the use of a single pressure sensor in detecting vibrations correlative to engine sound as well as vibrations correlative to engine knock by utilizing the output of the pressure sensor in an engine crankshaft angle range for detecting vibrations correlative to engine sound and in another engine crankshaft angle range for detecting vibrations correlative to engine knock, it is to be understood that two separate sensors may be used, one for sensing vibrations correlative to engine sound and the other for sensing vibrations correlative to engine knock.

Figure 6:
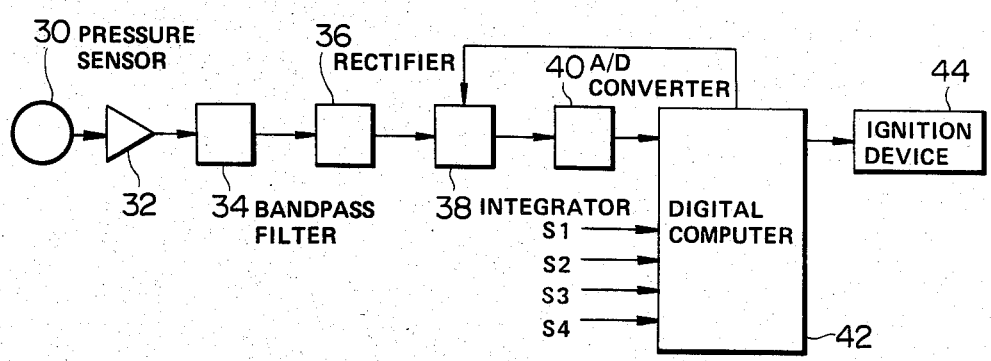
FIG. 6 is a schematic block diagram showing another embodiment of this invention.

Referring to FIG. 6, there is illustrated another embodiment of the present invention. In FIG. 6, the reference numerals 30, 32, 34 and 44 designate a cylinder pressure sensor, a charge amplifier circuit, a bandpass filter circuit, and an ignition device which are idential to the cylinder pressure sensor 10, the charge amplifier circuit 12, the bandpass filter circuit 14, and the ignition device 22 of FIG. 2, respectively.

The output of the bandpass filter circuit 34 is applied to a rectifier circuit 36 where it is rectified. The rectified signal is applied to an integrator circuit 38 which integrates the rectified signal and generates an analog signal directly proportional to the area defined by the rectified signal. The output of the integrator circuit 38 is applied to an analog-to-digital converter 40 which converts it into a corresponding digital signal for application to a digital computer 42.

The digital computer 42, which shall be regard as including an analog multiplexer, an analog-to-digital converter, a central processing unit, a memory, an interrupt circuit, and a clock oscillator, operates under a program control sequence in response to sensed engine operating conditions for controlling various engine operating parameters. The digital computer is responsive to an interrupt signal to temporarily stop execution of the program control sequence to start executing an interrupt routine for controlling the parameters during a specified operating condition.

The digital computer 42 has additional inputs from various sensors. Input signals to the digital computer include but are not necessarily limited to a reference position signal S1 coincident with a predetermined engine crankshaft angle, a crankshaft position signal S2 coincident with a predetermined number of degrees of rotation of the engine crankshaft, a signal S3 indicative of the sensed air flow rate Q, a signal S4 indicative of the sensed engine coolant temperature Tw. For example, the reference position signal S1 includes a series of reference pulse each corresponding to 720 engine crankshaft degrees, and the crankshaft position signal S2 includes a series of pulses each corresponding to one engine crankshaft degrees. Each of the signals S1 and S2 is used in generating an interrupt signal to temporarily stop execution of the program control sequence and to start executing of the program control sequence and to start executing an interrupt routine. The signals S1 and S2 are also applied to a frequency counter which generates a signal indicative of engine speed N. The analog signals S3 and S4 are applied to the analog-to-digital converter which converts them into corresponding digital signals indicative of the sensed air flow rate Q and the sensed engine coolant temperature Tw, respectively.

The digital computer 42 calculates a basic value for the timing of ignition spark events of the engine based upon engine operating parameters including engine load, engine speed, and engine temperature. The digital computer starts the integrator 38 integrating the vibration indicative signal (the output of the rectifier 36) at the beginning of a first predetermined range of engine crankshaft angles relative to piston top dead center, stops the integrator 38 from integrating the vibration indicative signal at the end of the first predetermined range, and generates a first signal corresponding to the result of integration of the vibration indicative signal in the first predetermined range. It is noted, therefore, that the first signal corresponds to the level of knock induced vibrations. The digital computer starts the integrator 38 integrating the vibration indicative signal at the beginning of a second predetermined range of engine crankshaft angles relative to piston top dead center, stops the integrator 38 from integrating the vibration indicative signal at the end of the second predetermined range, and generates a signal corresponding to the result of integration of the vibration indicative signal in the second predetermined range. Therefore, the second signal corresponds to the level of valve noises. The digital computer also generates a third signal corresponding to a limiting level.

The digital computer decides the occurrence of engine knock when the first signal exceeds at least one of the second and third signals. The digital computer modifies the basic value based upon the result of the engine knock decision and generates a timing adjustment signal corresponding to the modified basic value to the ignition device 44 which thereby times the ignition spark events of the engine.

FIG. 7 is a flow diagram illustrating the programming of the digital computer 42 as it is used to control the engine knock level by modifying the basic ignition timing which is separately calculated in a well-known manner based upon data including the sensed engine speed N, intake air flow rate Q and engine coolant temperature Tw.

The computer program is entered at the point 702 each time a crankshaft position pulse S2 occurs. At the point 704 in the program, the digital computer central processing unit reads the count of the counter which counts crankshaft position pulses S2 and clears the count upon the occurrence of a reference position pulse S1. Following this, at the point 706 in the program, a determination is made as to whether or not the engine crankshaft angle is 40° before top dead center.

In the answer to this question at step 706 is "yes", then the program proceeds to the point 708 where the integrator ciricuit 38 is released from a reset condition. As a result, the integrator circuit 38 starts integrating the output of the rectifier circuit 36 at forty engine crankshaft degrees before top dead center. If the answer to the question is "no", then at the point 710, another determination is made. This determination is as to whether or not the engine crankshaft angle is at 0°, that is, the piston top dead center position.

If the answer to this question in step 710 is "yes", then the program proceeds to the point 712 where the digital computer central processing unit drives the A/D converter 40 to convert the output of the integrator circuit 38 into digital form and reads the converted signal into the computer memory. This read value indicates the value resulting from the integration of the output of the rectifier circuit 36 from the time at which the engine crankshaft reaches 40 engine crankshaft degrees before top dead center to the time at which the engine crankshaft reaches the piston top dead center position. In other words, the read value indicates the level of the sensed vibrations induced when the intake valve seats on the associated valve seat. At the following point 714 in the program, the integrator circuit 38 is reset and then at the point 716, the integrator circuit 38 is released from the reset condition. Consequently, the integrator circuit 38 is reset and it starts integrating the output of the rectifier circuit 36 again when the engine crankshaft reaches the piston top dead center.

If the engine crankshaft angle inputted to the point 710 is not at 0 engine crankshaft degree, then at the point 718, another determination is made. This determination is as to whether or not the engine crankshaft angle is at 50 engine crankshaft degrees after top dead center. If the answer to this question is "yes", then the program proceeds to the point 720 where the digital computer central processing unit drives the A/D converter 40 to convert the output of the integrator circuit 38 into digital form and reads the converted signal into the computer memory. This read value indicates the value resulting from the integration of the output of the rectifier circuit 36 from the time at which the engine crankshaft reaches the piston top dead center to the time at which the engine crankshaft reaches 50 engine crankshaft degrees after top dead center. In other words, the read value indicates the level of the sensed vibrations correlative to engine knock. At the point 722 in the program, the integrator circuit 38 is reset. Following this, at the point 724, the digital computer central processing unit decides the occurrence of engine knock in the same manner as described in connection with the point 518 of FIG. 5. At the following point 726, the digital computer central processing unit modifies the basic value for the timing of the ignition spark events of the engine in the same manner as described in connection with the point 518 of FIG. 5.

This embodiment is advantageous over the first embodiment in that it can eliminate the need for an expensive high-speed analog-to-digital converter for use as the analog-to-digital converter 40 since the analog-to-digital converter 40 is driven only when the engine crankshaft reaches the piston top dead center position (point 712) and when the engine crankshaft reaches 50 engine crankshaft degrees after top dead center (point 720).

The counter which counts crankshaft position pulses S2 may be used in combination with a decision circuit which generates an interrupt signal when the count of the counter reaches 40 engine crankshaft degrees before top dead center, a value indicative of the piston top dead center position, or a value indicative of 50 engine crankshaft degrees after top dead center. This counter-decision circuit combination can reduce the time required to execute this program and share the saved time for other controls.

Figure 8:
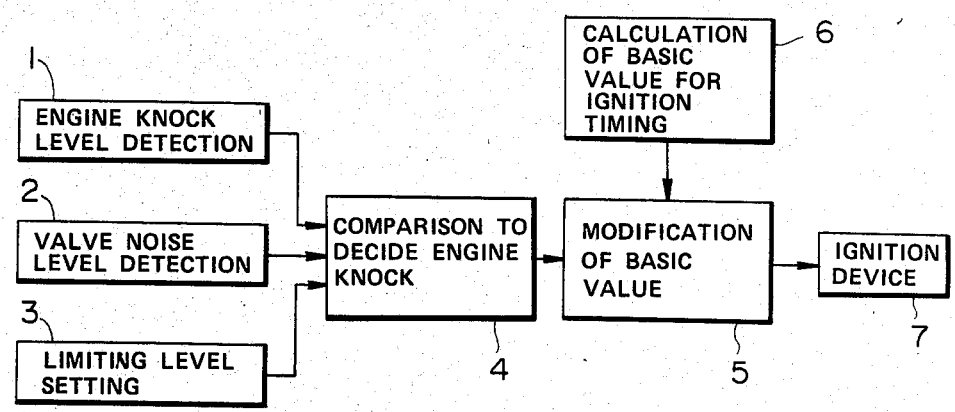
FIG. 8 shows functional portions of control apparatus in block diagram form.

Referring to FIG. 8, the knock level control apparatus is shown in block diagram form. The blocks of FIG. 8 represent function portions of the programmed digital computer 100. Given the description of this specification, appropriate digital and/or analog devices for such functional portions would be obvious to one skilled in the art in using the flow diagrams of FIGS. 5 and 7 as the basis for a hard-wire arrangement.

While the present invention has been described in connection with a spark ignited internal combustion engine, it is to be noted that the present invention is applicable to other types of engines such for example as diesel engines. In addition, while this invention has been described in conjunction with specific embodiments thereof, it is evident that many alternatives, modifications and variations will be apparent to one skilled in the art. Accordingly, it is intended to embrace all alternatives, modifications and variations that fall within the spirit and broad scope of the appended claims.

What is claimed is:

1. A method of controlling the level of knock in an internal combustion engine having knock induced vibrations and valve noises, comprising the steps of:
   calculating a basic value for the timing of ignition of said engine based upon engine operating parameters;
   generating a vibration indicative signal in response to knock induced vibrations and valve noises;
   generating a first and second signal in response to said vibration indicative signal, said first signal having a value corresponding to the level of the knock induced vibrations, said second signal having a value corresponding to the level of the valve noises;
   generating a third signal having a value corresponding to a limiting level;

deciding the occurrence of engine knock when said first signal exceeds at least one of said second and third signals; and modifying said basic value based upon the decision of the occurrence of engine knock.

2. The knock level control method as claimed in claim 1, wherein the step of generating a first and second signal comprises the steps of:

measuring the level of said vibration indicative signal in a first predetermined range of engine crankshaft angles relative to piston top dead center;

generating said first signal having a value corresponding to said vibration indicative signal level measured in said first predetermined range;

measuring the level of said vibration indicative signal in a second predetermined range of engine crankshaft angles relative to piston top dead center; and generating said second signal having a value corresponding to said vibration indicative signal level measured in said second predetermined range.

3. The knock level control method as claimed in claim 2, wherein the step of measuring the level of said vibration indicative signal in a first predetermined range of engine crankshaft angles relative to piston top dead center comprises the steps of reading values of said vibration indicative signal at constant time intervals in said first predetermined range, and adding said read values to obtain a sum corresponding to the level of said vibration indicative signal in said first predetermined range, and wherein the step of measuring the level of said vibration indicative signal in a second predetermined range of engine crankshaft angles relative to piston top dead center comprises the steps of reading values of said vibration indicative signal at constant time intervals in said second predetermined range, and adding said read values to provide a sum corresponding to the level of said vibration indicative signal in said second predetermined range.

4. The knock level control method as claimed in claim 3, wherein said first prdetermined range is taken from about 0 engine crankshaft degrees relative to piston top dead center to about 50 engine crankshaft degrees after piston top dead center and wherein said second predetermined range is taken from about 40 engine crankshaft degrees before piston top dead center to about 0 engine crankshaft degrees relative to piston top dead center.

5. The knock level control method as claimed in claim 1, wherein the step of generating a first and second signal comprises the steps of:

integrating said vibration indicative signal in a first predetermined range of engine crankshaft angles relative to piston top dead center;

generating said first signal having a value corresponding to the result of integratian of said vibration indicative signal in said first predetermined range;

integrating said vibration indicative signal in a second predetermined range of engine crankshaft engines relative to piston top dead center; and generating said second signal having a value corresponding to the result of integration of said vibration indicative signal in said second predetermined range.

6. The knock level control method as claimed in claim 5, wherein said first prdetermined range is taken from about 0 engine crankshaft degrees relative to piston top dead center to about 50 engine crankshaft degrees after piston top dead center and wherein said second predetermined range is taken from about 40 engine crankshaft degrees before piston top dead center to about 0 engine crankshaft degrees relative to piston top dead center.

7. The knock level control method as claimed in claim 2, wherein said first predetermined range is taken from about 0 engine crankshaft degrees relative to piston top dead center to about 50 engine crankshaft degrees after piston top dead center and wherein said second predetermined range is taken from about 40 engine crankshaft degrees before piston top dead center to about 0 engine crankshaft degrees relative to piston top dead center.

8. The knock level control method as claimed in claim 1, wherein said third signal has a predetermined constant value above which heavy vibrations occur to produce the possibility of failure of said engine.

9. The knock level control method as claimed in claim 1, wherein said third signal has a variable value above which heavy vibrations occur to produce the possibility of failure of said engine, said variable value depending on engine speed.

10. An apparatus for controlling the level of knock in an internal combustion engine having knock induced vibrations and valve noises, comprising:

means for generating a first signal having a value corresponding to the level of the knock induced vibrations;

means for generating a second signal having a value corresponding to the level of the valve noises;

means for generating a third signal having a value corresponding to a limiting level; and a control circuit for deciding the occurrence of engine knock when said first signal exceeds at least one of said second and third signals, said control circuit including means for calculating a basic value for the timing of ignition of said engine based upon engine operating parameters, said control circuit including means for modifying said basic value based upon the decision of the occurrence of engine knock, said control circuit including means for generating a timing adjusting signal corresponding to the modified value for the timing of ignition; and means responsive to the timing adjustment signal for timing the ignition of said engine.

11. The knock level control apparatus as claimed in claim 10, wherein said control circuit modifies said basic value in a manner to retard the timing of ignition when engine knock is decided.

12. The knock level control apparatus as claimed in claim 11, wherein said control circuit modifies said basic value in a manner to advance the timing of ignition when engine knock is not decided.

13. An apparatus for controlling the level of knock in an internal combustion engine having knock induced vibrations and valve noises, comprising:

a sensor mounted on said engine and responsive to both the knock induced vibrations and valve noises to generate a vibration indicative signal; and a control circuit responsive to said vibration indicative signal for generating a first and second signal, said first signal having a value corresponding to the level of the knock induced vibrations, said second signal having a value corresponding to the level of the valve noises, said control circuit including means for generating a third signal having a value corresponding to a limiting level, said control circuit including means for deciding the occurrence of engine knock when said first signal exceeds at least one of said second and third signals, said control circuit including means for calculating a basic value for the timing of ignition of said engine based upon engine operating parameters, said control circuit including means for modifying said basic value based upon the decision of the occurrence of engine knock.

14. The knock level control apparatus as claimed in claim 13, wherein said control circuit means for generating a first and second signal comprises:
  means for measuring the level of said vibration indicative signal in a first predetermined range of engine crankshaft angles relative to piston top dead center;
  means for generating said first signal having a value corresponding to said vibration indicative signal level measured at said first predetermined range;
  means for measuring the level of said vibration indicative signal in a second predetermined range of engine crankshaft angles relative to piston top dead center; and
  means for generating said second signal having a value corresponding to said vibration indicative signal level measured in said second predetermined range.

15. The knock level control apparatus as claimed in claim 14, wherein said means for measuring the level of said vibration indicative signal in a first predetermined range of engine crankshaft angles relative to piston top dead center comprises means for reading values of said vibration indicative signal at constant time intervals in said first predetermined range, and means for adding said read values to obtain a sum corresponding to the level of said vibration indicative signal in said first predetermined range, and wherein said means for measuring the level of said vibration indicative signal in a second predetermined range of engine crankshaft angles relative to piston top dead center comprises means for reading values of said vibration indicative signal at constant time intervals in said second predetermined range, and means for adding said read values to provide a sum corresponding to the level of said vibration indicative signal in said second predeterminend range.

16. The knock level control apparatus as claimed in claim 15, wherein said first predetermined range is taken from about 0 engine crankshaft degrees relative to piston top dead center to about 50 engine crankshaft degrees after piston to dead center and wherein said second predetermined range is taken from about 40 engine crankshaft degrees before piston top dead center to about 0 engine crankshaft degrees relative to piston top dead center.

17. The knock level control apparatus as claimed in claim 13, wherein said control circuit means for generating a first and second signal comprises:
  an integrator for integrating said vibration indicative signal;
  control means for starting said integrator integrating said vibration indicative signal at the beginning of said first prdetermined range and stopping said integrator from integrating said vibration indicative signal at the end of said first predetermined range, said control means starting said integrator integrating said vibration indicative signal at the beginning of said second predetermined range and stopping said integrator from integrating said vibration indicative signal at the end of said second predetermined range; and
  means for generating said first signal having a value corresponding to the result of integration of said vibration indicative signal in said first predetermined range and said second signal having a value corresponding to the result of integration of said vibration indicative signal in said second predetermined range.

18. The knock level control apparatus as claimed in claim 17, wherein said first prdetermined range is taken from about 0 engine crankshaft degrees relative to piston top dead center to about 50 engine crankshaft degrees after piston top dead center and wherein said second predetermined range is taken from about 40 engine crankshaft degrees before piston top dead center to about 0 engine crankshaft degrees relative to piston top dead center.

19. The knock level control apparatus as claimed in claim 14, wherein said first predetermined range is taken from about 0 engine crankshaft degrees relative to piston top dead center to about 50 engine crankshaft degrees after piston to dead center and wherein said second predetermined range is taken from about 40 engine crankshaft degrees before piston top dead center to about 0 engine crankshaft degrees relative to piston top dead center.

20. The knock level control apparatus as claimed in claim 18, wherein said third signal has a predetermined constant value above which heavy vibrations occur to produce the possibility of failure of said engine.

21. The knock level control apparatus as claimed in claim 13, wherein said third signal has a variable value above which heavy vibrations occur to produce the possibility of failure of said engine, said variable value depending on engine speed.

* * * * *